Figure 1:
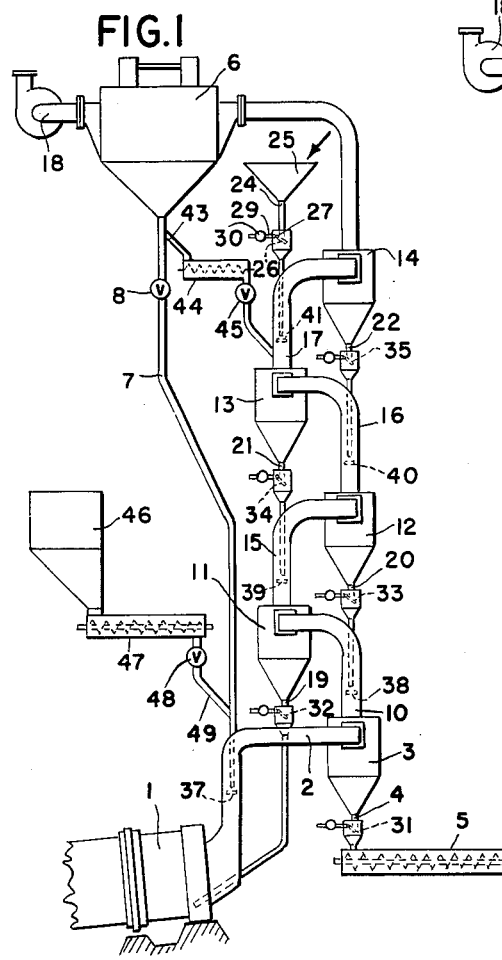

United States Patent Office 3,212,764
Patented Oct. 19, 1965

3,212,764
METHOD AND APPARATUS FOR HEATING AND BURNING CEMENT RAW MATERIAL, CONTAINING ALKALI
Franz Müller and Bernhard Kohlhaas, Bensberg-Refrath, and Leonhard Winners, Cologne-Kalk, Germany, assignors to Klockner-Humboldt-Deutz Aktiengesellschaft, Cologne-Deutz, Germany, a corporation of Germany
Filed Oct. 12, 1960, Ser. No. 114,572
Claims priority, application Germany, Oct. 17, 1959, K 38,940; Feb. 27, 1960, K 40,021
10 Claims. (Cl. 263—32)

The invention relates to methods for heating and burning (calcining) pulverulent material and, in a more particular aspect, for heating cement raw material, containing alkalies by direct contact with the exit gases of a kiln.

Some sorts of raw material contain larger amounts of alkalies, especially potassium and sodium in the form of oxides or salts, such as chlorides. When heating such raw material the alkalies become volatilized in the kiln and are withdrawn from the kiln in the form of vapors, or after condensation in the form of mists together with the exit gases of the kiln they pass into the preheated. From there the gases and mists are re-circulated into the kiln with the preheated material. Thus the exit gases of the kiln become enriched with alkalies, so that the cement raw material is charged with an increasing amount of alkalies. Because of the sticky qualities of the alkalies, especially at temperatures of 700–900° C., the flow of material may become restricted and may adhere to the surface of the preheater.

It is an object of this invention to provide a method for burning (calcining) cement raw material or the like and preheating the raw material by direct contact with the exit gases, which secures trouble free operation, even if the raw material contains considerable amounts of alkalies. To achieve these ends and in accordance with the present invention, the exit gases of the kiln before entering the preheater pass through a container in which they are brought into contact with a fine grained material, in order to precipitate the alkalies contained in the exit gases, said fine grained material passing continuously said container and being removed afterwards. The alkali vapors or mists are precipitated upon the fine grained material in solid form. In this way the contents of alkalies in cement raw material, which passes into the kiln, is removed or at least reduced to such an extent, that the abovementioned shortcomings in the operation of a preheater are eliminated.

According to another feature of this invention only a part of the exist gas passes through the container for precipitation and is lead through the preheater together with the main flow of exit gases afterwards. This permits bringing the raw material in the preheater to a higher temperature, than would have been possible if all of the exit gases had been passed through the container for precipitation. It also results in appreciably reducing the necessary amount of fine grained material for the precipitation of alkalies.

According to another feature of this invention a dust-from-gas separator, preferably a centrifuge dust-from-gas separator, is used as a container for precipitation and the fine grained solid material is fed into the exit gas pipe leading to said gas-from-dust separator. The fine grained, solid material is thoroughly mixed with the exit gases of the kiln and thus provides an extensive surface for the precipitation of the alkalies.

According to still another feature of this invention, ground stone can be used for the precipitation of the alkalies. Preferably the raw material recovered when cleaning the exit gases, may be used. It is also possible to use a part of the cement raw material itself for precipitating the alkalies.

According to still another feature of the invention the fine grained solid material for the precipitation of the alkalies can be cooled and recirculated in whole or in part. This results in reducing the necessary amount of said fine grained material.

Figure 3:
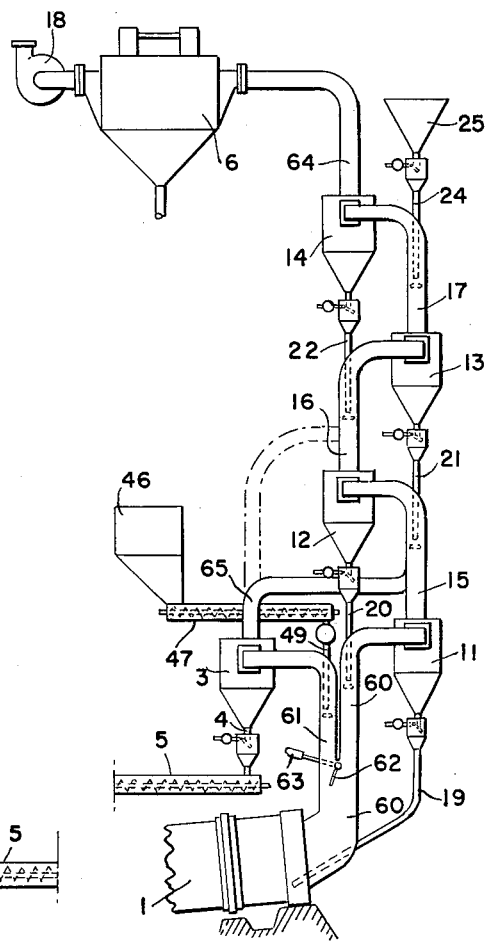
Figure 2:
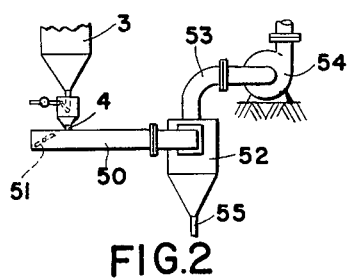

These and other features of this invention particularly pointed out in the claims annexed hereto will be apparent from the embodiments exemplified by the drawings and described in the following:

FIGURE 1 shows one embodiment of the invention;
FIGURE 2 show a detail of the apparatus for cooling and removal of material containing precipitated alkalies; and
FIGURE 3 shows another embodiment of the invention.

In FIG. 1 the upper inlet end of a rotary kiln 1 is connected to an exit gas pipe 2, which is sealed against said rotary kiln by suitable means. The exit gas pipe 2 connects the rotary kiln 1 to a container 3, which consists of a centrifugal dust-from-gas separator (cyclone). The cyclone 3 is connected by dust discharge pipe 4 to a screw type conveyor 5. Exit gas pipe 10 of the cyclone 3 leads to a preheater consisting of a group of heat exchange separators 11, 12, 13, 14 connected in series. The heat exchange separators 11, 12, 13, 14 consist of cyclones and are interconnected by pipes 15, 16, 17 in such a manner that the exit gases are sucked through the cyclones and a dust collecting system, preferably an electrical precipitator by a blower 18. Dust discharge pipe 7 of the electrical precipitator 6 is connected to a pocket wheel 8 which serves a means for dosage of the dust flowing through and as a seal against the flowing through of gas. The pocket wheel 8 is then connected to the exit gas pipe 2. Dust discharge pipe 19 of heat exchange separator 11 is connected to the rotary kiln 1. Dust discharge pipes 20, 21, 22 of the heat exchange separators 12, 13, 14 are connected to the exit gas pipes 10, 15, 16 which lead to the respective preceding separator. A material inlet pipe 24 extends into the exit gas pipe 17. The material inlet pipe 24 is provided with a hopper 25. Cement raw material is fed into this hopper. The material inlet pipe 24 has a slanted discharge opening, closed by a flap gate 26, fixed to a shaft 27. Shaft 27 is rotatably supported in housing 28 and attached to it is a moment arm 29, provided with a displaceable weight 30. Arm 29 and weight 30 kept the flap gate 26 closed against the opening of the pipe 24. Thus material accumulates in pipe 24 and prevents any gas from entering pipe 24. Analogous flap gates 31, 32, 33, 34, and 35 are provided in the dust discharge pipes 4, 19, 26, 21 22. The exit gas pipes 2, 10, 15, 16, 17 are provided with circular baffle plates 37, 38, 39, 10 and 41 below pipes 7, 20, 21, 22, and 24.

During operation cement raw material is fed continously to hopper 25 into pipe 24 and is distributed well into the exit gas pipe by baffle plate 41. The raw material is fluidized by the gas flow and carried into the heat exchange separator 14. The raw material discharged in cyclone 14 is fed into exit gas pipe 16 through dust discharge pipe 22 and is carried into heat exchange separator 13 by the gas flow. Analogously the raw material passes through the heat exchange separators 12 and 11 and is finally fed into the rotary kiln through dust discharge pipe 19. The cement raw material passes through a series of separators and gas pipes, it increases its temperature as it progresses closer to the feed end of the kiln because of the hotter gases in the lower separators. The heat from the exit gases is exchanged to the cement raw material so that the raw material enters the kiln with a high temperature. In the kiln the raw material is calcined to clinker. The alkalies contained in the raw material become vaporized and are carried away by the exit gases.

The dust precipitated in the electrical precipitator 6 possesses only low heat content and falls into pipe 7 leaving the pocket wheel in a steady continuous stream. When passing through pipe 7 the dust gives off so much heat, that it leaves the pipe cold, dropping onto baffle plate 37. From there it is distributed finely into the gas flow, passing through pipe 2 and is carried into cyclone 3. This results in cooling the exit gases to such an extent that the alkalies condense upon the raw material dust.

The amount of raw material dust, in exit gas pipe 2 is large enough to secure precipitation of the alkalies and still maintains the flowability of the dust, so that it does not adhere to the cyclone 3 and the parts connected hereto. The amount of dust on the other hand should not be too large, because of unnecessary losses of heat. The correct and suitable amount can easily be determined by experiments from case to case.

If more raw material dust is collected by the electrical precipitator 6 as necessary for use in cyclone 3 the excessive amount can be fed to the rotary kiln or to the preheater through exit gas pipe 17. For that purpose pipe 7 is connected to a pipe 43 above the pocket wheel 45. Pipe 43 is connected to pipe 17 through a screw type feeder 44 and a pocket wheel 45. If less raw material dust is collected by the electrical precipitator 6 than necessary, fresh raw material can be added. In that case fresh raw material is fed through a hopper 46, a screw type feeder 47 and pipe 49 with a pocket wheel 48 to pipe 47. Another possibility is to feed all of the dust collected in the electrical precipitator 6 into the kiln or the preheater. In that case only fresh raw material is fed to exit gas pipe 2.

FIG. 2 describes an apparatus for conveying and simultaneous cooling of the fine grained material containing precipitated alkalies, leaving cyclone 3. The dust discharge pipe 4 of the cyclone 3 is connected to a pipe 50, open at both ends, and provided with a flap valve on one end and connected to a cyclone 52 on the other end. Gas feed pipe 53 of cyclone 52 is connected to a blower 54 and leads into the open. Dust discharge pipe 55 ends above a dust container (not shown). During operation blower 54 sucks air into pipe 50 which carries the material leaving pipe 4 into cyclone 52. During this operation the material gives a great deal of its heat to the air which is discharged into the open behind the blower 54. The material separated in cyclone 52 is discharged through pipe 55.

FIG. 3 shows still another apparatus. All parts corresponding to FIG. 1 bear the same reference numbers as in FIG. 1. The upper inlet end of the rotary kiln 1 is connected to an exit gas pipe 60 which leads to the preheater comprising cyclones 11, 12, 13 and 14. Exit gas pipe 60 is also connected to a pipe 61. The pipe 49 connected to a hopper 46 through the screw type feeder 44 is also connected to pipe 61. Pipe 61 leads to a precipitation contained in form of a cyclone 3. The exit gas pipe of cyclone 3 is connected to pipe 15, which in turn connects the heat exchange separators 11 and 12 with each other.

During operation one flow of exit gases (main flow) is sucked through pipe 60 into the heat exchange separator into cyclone and another flow of exit gases is sucked through pipe 61 into cyclone 3. Both gas flows are united again in exit gas pipe 15 and pass through the heat exchange separators to the electrical precipitator 6. The material to be heated and burned, such as cement raw material, passes through the cyclones 11, 12, 13, and 14 in counter flow and is fed through dust discharge pipe 19 of the cyclone 11 into the rotary kiln.

A fine grained solid material, such as ground limestone, is fed through hopper 46 into the exit gas pipe 61. It is aerated and carried into cyclone 3 by the gas flow passing through pipe 61. The alkali vapors or mists, contained in the exit gas condensed upon the limestone. The gas cleaned from alkalies passes from pipe 65 into pipe 15. The lime stone loaded with alkalies is separated from the gas in cyclone 3 and discharged through pipe 4 into the screw-type conveyor 5.

The alkali vapors and mists contained in the gas passing to the heat exchange separator 11 are precipitated to a high degree at the cement raw material which is fed to pipe 60 through dust discharge pipe 20. It is important that the proportion of gas separated from the main gas flow by means of flap gate 62 to the gas flowing through pipe 60 is determined in such a way that the quantity of alkalies carried into the cement raw material by the gas flowing through pipe 60 is so little, that the cement raw material does not cake or lose its flowability due to the alkalies condensing on it. On the other side, the amount of gas passing through pipe 60 should not be less than necessary. An appreciable advantage of the apparatus according to FIG. 3 is that the cement raw material leaving dust discharge pipe 20 is mixed with new exit gases of the kiln. The larger the amount of new exit gases is, the higher is the temperature to which the cement raw material is heated in the preheater. The amount of gas flowing to the cyclone 3 and coming in contact with the ground limestone is inversely proportional to the amount of gas flowing to the heat exchange cyclone 11. The greater the amount of ags flowing to the heat exchange cyclone 11 is, the smaller is the amount of gas coming in contact with the limestone, and the smaller are the losses of heat.

In case that the fine grained solid material for the precipitation of the alkalies consists of limestone or cement raw material it can be used as fertilizer or mason's lime (de-acidified lime). The fine grained material leaving the cyclone 3 and carrying alkalies can be cooled and re-circulated in whole or in part. This results in decreasing the necessary amount of this material. A further advantage of the re-circulation is a higher concentration of alkalies than could be achieved by using the material only once. This is of advantage when the enriched material is used as fertilizer afterwards.

As said before the contents of alkalies in the clinker can be eliminated or at least decreased by the present invention.

We claim:

1. A process of preheating and treating cement raw material prior to passing said raw material into a kiln in counterflow to exit gases issuing from said kiln, comprising the steps of passing hot exit gases from a kiln and forcing at least part of said exit gases through a container after said exit gases leave the kiln, bringing said part of said exit gases into contact with a fine grained solid material in said container for precipitation of alkalies contained in said part of said exit gases while simultaneously passing said fine grained solid material through said container in continuous flow, removing from said container said fine grained solid material after the latter has taken up the alkalies so as to decrease the alkali content of the exit gases used for preheating the cement raw material, and then passing the cement raw material through a preheater in direct contact with said part of said exit gases after said part of said exit gases has passed through said container.

2. A process of preheating and treating cement raw material according to claim 1, said fine grained solid material being of the same composition as the raw material to be processed.

3. A process of preheating and treating cement raw material prior to passing said raw material into a kiln in counterflow to exit gases issuing from said kiln, comprising the steps of passing hot exit gases from a kiln and forcing at least part of said exit gases through a container after said exit gases leave the kiln, bringing said part of said exit gases into contact with a fine grained solid material in said container for precipitation of alkalies contained in said part of said exit gases while simultaneously passing said fine grained solid material through said container in continuous flow, removing from said container said fine grained solid material after the latter has taken up the alkalies so as to decrease the alkali content of the exit gases used for preheating the cement raw material, combining said part of said exit gases with the rest of the exit gases after said part of said exit gases has passed through said container, and then passing the cement raw material through a preheater in direct contact with the combined part and rest of said exit gases, thereby permitting the preheating of said cement raw material to a higher temperature by said combination of said rest of said exit gases and said part of said exit gases with less alkali content in said cement raw material than would have been possible had said cement raw material been preheated only by exit gases directly from said kiln.

4. A process of preheating and treating cement raw material according to claim 3, including the step of controlling the proportion of said part of exit gases to said rest of the exit gases so that the quantity of alkalies carried into the cement raw material by said rest of the gas will be sufficient to cause the cement raw material to cake and lose its flowability.

5. A process of preheating and treating cement raw material according to claim 3, including the step of separating out from said exit gases dust entrained therein, said fine grained solid material comprising said dust separated out from said gases.

6. A process of preheating and treating cement raw material prior to passing said raw material into a kiln in counterflow to exit gases issuing from said kiln, comprising the steps of passing hot exit gases from a kiln and forcing at least part of said exit gases through a container after said exit gases leave the kiln, bringing said part of said exit gases into contact with a fine grained solid material in said container for precipitation of alkalies contained in said part of said exit gases while simultaneously passing said fine grained solid material through said container in continuous flow, removing from said container said fine grained solid material after the latter has taken up the alkalies so as to decrease the alkali content of the exit gases used for preheating the cement raw material, recirculating at least a portion of the removed fine granular material back to said container, and then passing the cement raw material through a preheater in direct contact with said part of said exit gases after said part of said exit gases has passed through said container.

7. The process of claim 6, including the step of cooling said portion of said fine grained solid material prior to recirculating it back to said container.

8. The process of claim 6, including the step of cooling the fine grained solid material removed from said container by forcing same through a pipe together with a cold gaseous medium flowing through said pipe, and conveying the gaseous medium and fine grained solid material entrained therein into a dust-from-gas separator for separation of said solid material from said gaseous medium.

9. Apparatus for preheating cement raw material prior to passing said raw material into a kiln in counterflow to exit gases issuing from said kiln, comprising a kiln and a flow system associated therewith for said exit gases issuing therefrom, flow system including a plurality of preheaters, a cyclone vessel located subsequent to said kiln but before at least some of said preheaters for bringing at least part of said exit gases into direct contact with a fine grained solid material in said cyclone vessel for the precipitation of alkalies contained in said part of said exit gases while simultaneously passing said fine grained solid material through said cyclone vessel in a continuous flow, means for conducting the gases from said kiln to said preheaters and to said cyclone vessel, means connecting said cyclone vessel with said preheaters, and conveyor means associated with said cyclone vessel for removing from said cyclone vessel and said kiln said fine grained solid material after it has taken up the alkalies.

10. Apparatus according to claim 9, said means for conducting the gases including bifurcated conduit means connected to and leading from said kiln and having a branch for leading said part of said exit gases to said cyclone vessel, and gate means within said bifurcated conduit means for controlling the proportion of said part of said exit gases to the rest of said exit gases.

References Cited by the Examiner
UNITED STATES PATENTS 1,909,820    5/33    Falla _____ 263—53
2,796,249    6/57    Plass _____ 263—32

FOREIGN PATENTS 879,652    11/42    France.

WILLIAM F. O'DEA, *Acting Primary Examiner.*

ALDEN D. STEWART, JOHN J. CAMBY, CHARLES SUKALO, *Examiners.*

UNITED STATES PATENT OFFICE
CERTIFICATE OF CORRECTION

Patent No. 3,212,764　　　　　　　　　　　　　October 19, 1965

Franz Müller et al.

It is hereby certified that error appears in the above numbered patent requiring correction and that the said Letters Patent should read as corrected below.

In the heading to the sheet of drawing, line 1, for "Oct. 12, 1965" read -- Oct. 19, 1965 --.

Signed and sealed this 23rd day of August 1966.

(SEAL)
Attest:

ERNEST W. SWIDER　　　　　　　　　　　　　　EDWARD J. BRENNER
Attesting Officer　　　　　　　　　　　　　　　　Commissioner of Patents